United States Patent
Arnold et al.

(10) Patent No.: US 7,617,181 B2
(45) Date of Patent: *Nov. 10, 2009

(54) OPTIMIZATION OF DATABASE NETWORK TRAFFIC BASED UPON DATA-USE ANALYSIS

(75) Inventors: Jeremy Alan Arnold, Rochester, MN (US); Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 11/465,246

(22) Filed: Aug. 17, 2006

(65) Prior Publication Data

US 2006/0294080 A1 Dec. 28, 2006

Related U.S. Application Data

(63) Continuation of application No. 10/124,845, filed on Apr. 18, 2002, now Pat. No. 7,127,463.

(51) Int. Cl.
*G06F 17/30* (2006.01)
(52) U.S. Cl. .................. 707/2; 707/3; 707/4; 707/5; 707/10
(58) Field of Classification Search .............. 707/2, 707/3, 4, 5, 10
See application file for complete search history.

(56) References Cited

U.S. PATENT DOCUMENTS 5,668,987 A 9/1997 Schneider
5,701,461 A 12/1997 Dalal et al.
5,765,147 A 6/1998 Mattos et al.
5,857,188 A 1/1999 Douglas
5,875,334 A 2/1999 Chow et al.
5,956,706 A * 9/1999 Carey et al. .................. 707/2
6,003,022 A 12/1999 Eberhard et al.
6,003,050 A 12/1999 Silver et al.
6,044,442 A 3/2000 Jesionowski (Continued)

OTHER PUBLICATIONS

Hab, Kazimierz Subieta, Metamodel for Object-Oriented Database Management Systems, Nov. 2002.*

(Continued)

*Primary Examiner*—Jean M Corrielus
(74) *Attorney, Agent, or Firm*—Wood, Herron & Evans, LLP

(57) ABSTRACT

An apparatus, program product and method utilize one or more usage statistics, which are reflective of what data is actually and/or likely to be used by a client when processing a database query, to reduce or eliminate the transfer of unnecessary data between a client and server in a client-server database management system. Information such as the columns that are or have been used and/or the number of rows that have been accessed, may be utilized to identify certain data that is likely to not be used during processing of the database query. Based upon the data that has been identified, a subset of the data that would otherwise be returned as a result of the database query may be identified and returned to a client, often substantially reducing the amount of data required to be retrieved by a client in connection with a database query.

25 Claims, 2 Drawing Sheets

U.S. PATENT DOCUMENTS

| | | |
|---|---|---|
| 6,115,703 A | 9/2000 | Bireley et al. |
| 6,134,540 A | 10/2000 | Carey et al. |
| 6,182,133 B1 | 1/2001 | Horvitz |
| 6,195,653 B1 | 2/2001 | Bleizeffer et al. |
| 6,199,063 B1 | 3/2001 | Colby et al. |
| 6,233,578 B1 | 5/2001 | Machihara et al. |
| 6,236,997 B1 | 5/2001 | Bodamer et al. |
| 6,266,658 B1 | 7/2001 | Adya et al. |
| 6,275,820 B1 | 8/2001 | Navin-Chandra et al. |
| 6,363,371 B1 | 3/2002 | Chaudhuri et al. |
| 6,366,901 B1 | 4/2002 | Ellis |
| 6,370,522 B1 | 4/2002 | Agarwal et al. |
| 6,411,951 B1 | 6/2002 | Galindo-Legaria et al. |
| 6,438,537 B1 | 8/2002 | Netz et al. |
| 6,496,843 B1 | 12/2002 | Getchius et al. |
| 6,519,604 B1 | 2/2003 | Acharya et al. |
| 6,529,901 B1 | 3/2003 | Chaudhuri et al. |
| 6,546,382 B1 | 4/2003 | Amor et al. |
| 6,629,094 B1 | 9/2003 | Colby et al. |
| 6,678,674 B1 | 1/2004 | Saeki |
| 6,718,320 B1 | 4/2004 | Subramanian et al. |
| 6,728,720 B1 | 4/2004 | Lenzie |
| 6,732,360 B1 | 5/2004 | Seo et al. |
| 6,795,817 B2 | 9/2004 | Agarwal et al. |
| 6,795,826 B2 * | 9/2004 | Flinn et al. .................. 707/100 |
| 6,801,914 B2 | 10/2004 | Barga et al. |
| 6,879,990 B1 | 4/2005 | Boyer et al. |
| 6,901,582 B1 | 5/2005 | Harrison |
| 6,941,451 B2 | 9/2005 | Rudy et al. |
| 7,058,622 B1 * | 6/2006 | Tedesco ......................... 707/2 |
| 7,096,219 B1 | 8/2006 | Karch |
| 7,127,463 B2 | 10/2006 | Arnold et al. |
| 7,185,001 B1 | 2/2007 | Burdick et al. |
| 7,356,523 B2 * | 4/2008 | Arnold et al. .................. 707/2 |
| 2001/0029542 A1 | 10/2001 | Nishimura |
| 2002/0091712 A1 | 7/2002 | Martin et al. |
| 2003/0110153 A1 | 6/2003 | Shee |
| 2003/0126232 A1 | 7/2003 | Mogul et al. |
| 2003/0220941 A1 * | 11/2003 | Arnold et al. ............... 707/200 |
| 2004/0205062 A1 | 10/2004 | Brown et al. |
| 2004/0205065 A1 | 10/2004 | Petras et al. |
| 2006/0294080 A1 * | 12/2006 | Arnold et al. .................. 707/3 |
| 2007/0156726 A1 * | 7/2007 | Levy .......................... 707/100 |
| 2007/0192352 A1 * | 8/2007 | Levy .......................... 707/102 |

OTHER PUBLICATIONS

J. Heidebrecht, "developerWords : Java technology : What's new in JDBC 3.0", http://www-106.ibm.com/developerworks/library/j-jdbcnew/index/html, Jul. 25, 2001.

Bernstein et al., "Context-Based Prefetch for Implementing Objects on Relations," Proceedings of the 25th VLDB Conference Edinburgh, Scotland, 1999.

Palmer et al., "Fido: A cache that learns to fetch," Proceedings of the 17th International Conference on VLDB, Sep. 1991.

US Patent and Trademark Office, Pre-Interview Communication issued in related U.S. Appl. No. 11/189,395, dated Feb. 26, 2009 (5 pages).

* cited by examiner

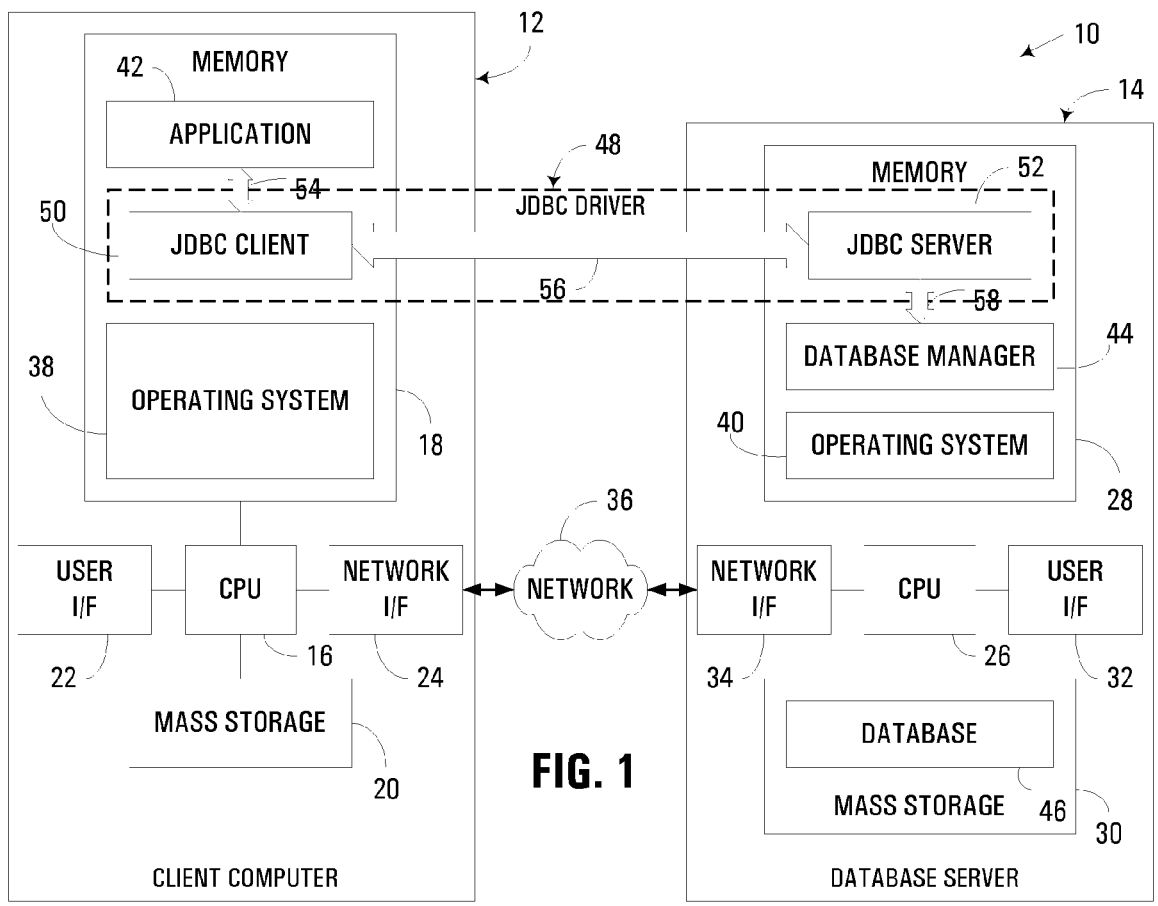
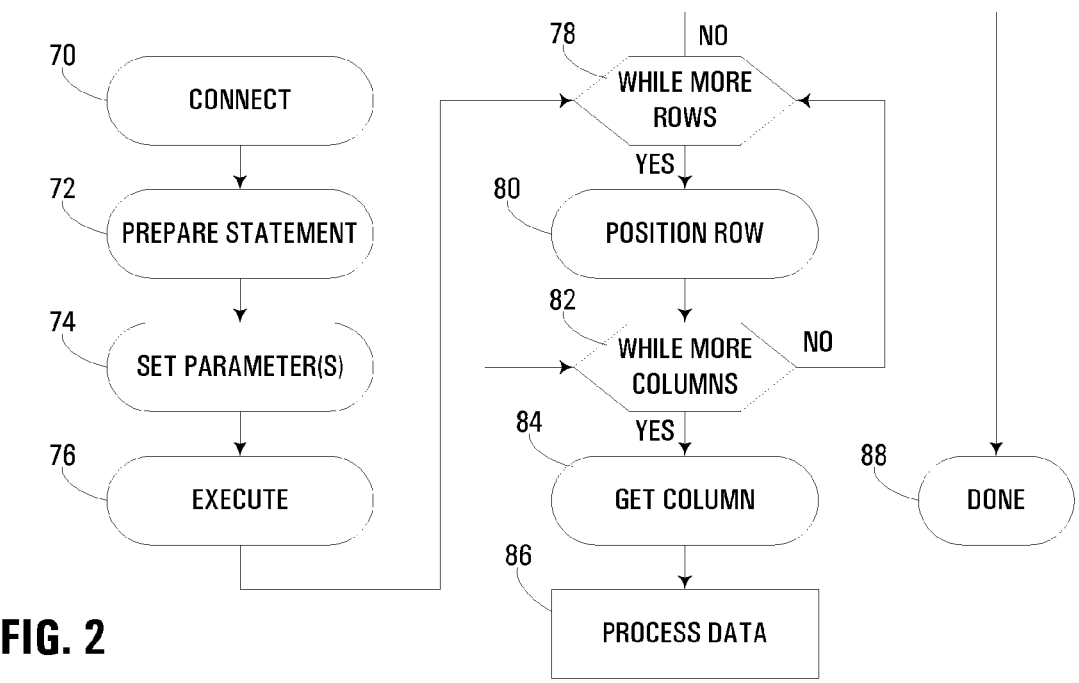
FIG. 1
FIG. 2

OPTIMIZATION OF DATABASE NETWORK TRAFFIC BASED UPON DATA-USE ANALYSIS

CROSS-REFERENCE TO RELATED APPLICATIONS

This application is a continuation of U.S. patent application Ser. No. 10/124,845 filed on Apr. 18, 2002 now U.S. Pat. No. 7,127,463 by Jeremy Alan Arnold et al. (ROC920010316US1), and is related to U.S. patent application Ser. No. 11/189,395 filed on Jul. 26, 2005 by Jeremy Alan Arnold et al. (ROC920010316US2). Both applications are incorporated by reference herein in their entirety.

FIELD OF THE INVENTION

The invention relates to database management systems, and in particular, to database management systems implemented in client-server environments.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query. In addition, a reduced reliance on runtime interpretation of queries in favor of increased usage of directly-executable program code has improved query engine performance.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

It has been found that one area of inefficiency in many database management systems is due to the flow of data from a database server to a client, e.g., to retrieve tabular data (i.e., row and column data) requested by a client. As is well known in the art, a number of database management systems are distributed in nature, whereby a server, implemented using one or more computers, is coupled to a multitude of remote clients via a network. In many environments, for example, clients may be coupled to a server over a local area network, wide area network, or even a public network such as the Internet.

As with all distributed computing systems, client-server database management systems are often constrained by the bandwidth between the server and clients, as the transmission of data over a network is often several orders of magnitude slower than the transmission of data internally within a computer. As such, it is often desirable to minimize the latency associated with transmitting data over a network between a client and a server in a client-server database management system.

One manner of enhancing client-server database performance is referred to as "prefetch" support. With prefetch support, a memory buffer, referred to as a prefetch cache, is maintained on a client computer, and data is transmitted from a server to a client in the form of blocks that contain, in addition to data requested by a client, additional data that will likely be requested later by the client. In some environments, a first block of data may even be prefetched before any data is actually requested by the client, e.g., during initial execution of a database query, and prior to the actual retrieval and analysis of the data by the client.

As an example of the operation of a prefetch cache, consider where a client requests all of the rows in a particular table. By virtue of prefetching, once the client requests the first row, the database may return a block of rows to the prefetch cache, such that, once a second row is requested by the client, that row is already available in the prefetch cache.

Even in prefetch-enabled systems, the flow of tabular data from a server to a client is often inefficient, which can needlessly waste valuable bandwidth, and thus hinder database performance. Such inefficiencies typically take the form of transmitted data that is never actually used by the client. Often, the inefficiencies are as a result of careless coding by application developers, database access code generators that lack knowledge of what an application using them will really do, and database access optimizations that are applied too early in the execution process and never re-evaluated.

As one example, a common statement utilized in many database queries is a "SELECT *" statement. A SELECT statement is a common structured query language (SQL) statement utilized in SQL-compatible relational databases to request the retrieval of one or more columns of data from one or more rows in a table. As is well known in the art, relational databases organize data into tables consisting of rows and columns, with each row being analogous to a "record" in a non-relational database, and each column being analogous to a field in a record.

The "SELECT *" notation is often used by application coders to request all columns from all rows be returned from a particular table. In many instances, the "SELECT *" statement is used even though comparatively few of the columns in each row are actually used by later statements. However, because the statement requests all the columns, the software that interacts with the database is typically required to fetch all of the columns for each requested row from the database. As a result, a significant amount of data that is never used by the client may be transferred from the server to the client in response to such a query.

The software that handles the interaction between a database and the clients that utilize the database often takes many forms. For example, one structured programming interface that permits clients, and typically client applications residing on client computers to access a particular database, is a distributed database driver such as a Java Database Connectivity (JDBC) database driver. With a JDBC driver architecture, typically separate client and server portions of the driver are resident on a client and server computer, and are used to handle both the transmission of requests from the client to the server, as well as the transfer of results back to the client from the server.

Many database drivers support functionality such as prefetching, connection pooling, statement pooling and other enhancements to improve performance; however, conventional database drivers are typically required to obtain all data requested by a client application. Put another way, statements generated by clients are required to be processed by returning all of the data requested thereby. Thus, any enhancements in performance available via conventional database drivers can be offset by inefficiencies in application coding that requests unnecessary data.

As another example of an inefficiency in a database management system due to the transfer of unnecessary data, in many databases, unless a query specifically restricts the maximum number of rows to return in response to the query, typically every block will be filled with as many rows of data that can fit in the block, even if only a few rows will ultimately be used by the client application. In some situations, for example, data may be returned based upon a predetermined sort order, whereby the client application may only need information from the first few rows. However, by filling a block completely with a full compliment of rows, a significant amount of unnecessary data may nonetheless be transferred from the server to the client.

Therefore, a significant need exists in the art for a manner of optimizing the transfer of data between a server and a client in a client-server database management system, in particular to minimize the amount of unnecessary data transferred therebetween.

SUMMARY OF THE INVENTION

The invention addresses these and other problems associated with the prior art by providing an apparatus, program product and method in which one or more usage statistics, reflective of what data is actually and/or likely to be used by a client when processing a database query, are utilized to reduce or eliminate the transfer of unnecessary data between a client and server in a client-server database management system.

Consistent with the invention, a determination is made as to whether any of the data that is capable of being returned in response to a database query generated by a client has been used and/or is likely to be used by that client when processing the results of the database query. In connection with this determination, a subset of the data representing the results of the database query may be transmitted to the client in lieu of the entire set of data. Moreover, once it has been determined that certain data that is not in the subset is unlikely to be used by the client, transmission of that data may be avoided, thus reducing the volume of information transmitted from a server to a client in connection with processing of the database query.

Certain embodiments consistent with the invention may also be utilized in connection with prefetch-enabled database management systems to reduce the amount of unnecessary information in the blocks of data transferred from a client to a server. As such, the number of blocks that must be retrieved in connection with processing a particular database query may often be reduced, thereby reducing latency and improving database performance.

In embodiments that utilize relational databases, usage statistics consistent with the invention may indicate, for example, which columns in a table are actually used by a client in connection with a database request. Usage statistics may also indicate, in addition to or in lieu of column usage information, a maximum number of rows that are typically accessed in connection with a database request. Other usage statistics that are reflective of how data is actually used, how data was used in the past, and/or how data is likely to be used, will be apparent to one of ordinary skill in the art having the benefit of the instant disclosure. Therefore, the invention is not limited to the particular embodiments described herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of a client-server computer system incorporating a database management system consistent with the invention.

FIG. 2 is a block diagram illustrating the principal steps occurring during execution of a database query in the computer system of FIG. 1.

DETAILED DESCRIPTION

Figure 3:
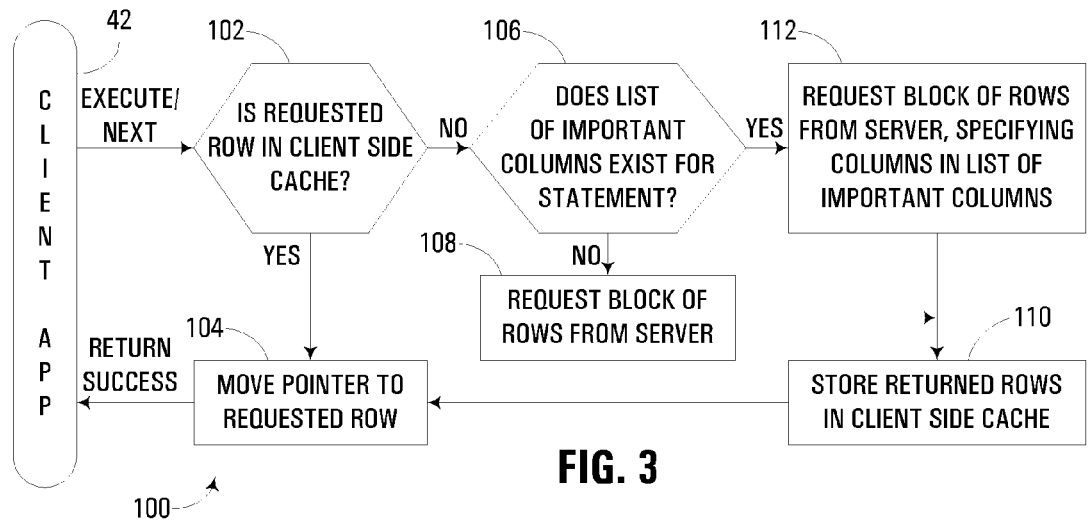
FIG. 3 is a flowchart illustrating the program flow of a position row routine executed by the client-side database driver in response to the position row request illustrated in FIG. 2.

Turning now to the Drawings, wherein like numbers denote like parts throughout the several views, FIG. 1 illustrates a client-server based database environment 10 consistent with the invention. System 10 includes at least one apparatus, e.g., one or more client computers 12 and one or more server computers 14. For the purposes of the invention, each computer 12, 14 may represent practically any type of computer, computer system or other programmable electronic device capable of respectively functioning as a client or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14.

Computer 12 typically includes a central processing unit 16 including at least one microprocessor 12 coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, mass storage 30, user interface 32 and network interface 34. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention.

Computers 12, 14 are generally interfaced with one another via a network 36, which may be public and/or private, wired and/or wireless, local and/or wide-area, etc. Moreover, network 36 may represent multiple, interconnected networks.

Each computer 12, 14 operates under the control of an operating system 38, 40, and executes or otherwise relies upon various computer software applications, components, programs, objects, modules, data structures, etc. Moreover, various applications, components, programs, objects, modules, etc. may also execute on one or more processors in another computer coupled to computer 12, 14 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Embodiments consistent with the invention are configured to optimize network traffic in a client-server database management system by responding to database queries by returning to a client only a subset of the data requested by the client in a database query based upon a usage statistic associated with the database query. Accordingly, information pertaining to how data is actually used, or is likely to be used, by a client is utilized to inhibit the transmission and/or retrieval of at least a portion of the data that has been requested by a client in connection with a particular query.

In the context of the invention, a client may generally be considered to include any program code resident on a computer or other programmable electronic device that is capable of making requests of another computer in a distributed computer system. Likewise, a server may generally be considered to include any program code resident on a computer or other programmable electronic device that is capable of servicing such requests in a distributed computer system. It should also be appreciated that a server in this context may be resident on the same computer as the actual database being accessed by a client, or in the alternative, the server may be resident on an intermediate computer coupled between the client(s) and the actual database.

In the illustrated embodiment discussed below, the optimization of network traffic is accomplished in connection with the prefetch of data into a client-side prefetch cache. A client application, resident on a client computer, initiates database queries to a database via a database driver, which incorporates additional functionality to prefetch data into the prefetch cache such that data requests associated with a database query by the client application can optimally be retrieved from the prefetch cache, thereby reducing the latency to fulfill the request.

As will become more apparent below, the prefetching of data into the prefetch cache, as well as the tracking of usage statistics, is performed by a client-side portion of a client-server database driver. Moreover, intra-driver requests are made by the client-side portion to a server-side portion of the database driver to request the specific subsets of data to be prefetched into the prefetch cache. The server-side portion of the database driver is adapted to respond to the requests from the client-side portion by accessing the database to retrieve the requested data, and then forward such data back to the client-side portion for placement in the prefetch cache.

For example, as shown in FIG. 1, client computer 12 has resident within memory 18 one or more client applications 42 that function as users or clients of a database manager 44 resident in memory 28 of server computer 14. Database manager 44 handles the server-side access of a database 46, shown resident in mass storage 30.

A database driver 48 has a client-side portion 50 and a server-side portion 52 that communicate with one another to seamlessly interface client applications 42 with database manager 44. As is well known in the art, client-side portion 50 includes an Application Programming Interface (API) supporting a set of functions available to the applications, as represented by arrow 54. In addition, client-side portion 50 is interfaced with server-side portion 52 through a set of functions specific to those components, as represented by arrow 56. Moreover, server-side portion 52 accesses database manager 44 through a set of functions made available by the database manager, as represented by arrow 58. Thus, as shown in FIG. 1, access to database 46 by a client application 42 typically occurs through a series of interactions between the client application, the client-side and server-side portions 50, 52 of driver 48 and database manager 44.

In the illustrated embodiment, database driver 48 is implemented as a Java Database Connectivity (JDBC) driver, the use and configuration of which is well known in the art. Database manager 44 may be implemented using practically any database management system capable of interfacing with JDBC drivers.

However, it will be appreciated that other database driver implementations may be used in the alternative. Moreover, as will become more apparent below, the functionality allocated to the database driver portions (e.g., which portion performs usage tracking, which portion determines the subset(s) of data to be transferred, etc.), and the functionality allocated to the client application and database manager, may vary in different applications. Moreover, a database driver may be implemented solely within a client or server computer, and in some implementations, no driver interface may be used. Some databases, for example, support network connections, whereby all of the functionality described herein may be implemented in a client-side database driver.

Furthermore, in still other embodiments, both the client and server may reside in the same physical electronic device. In such embodiments, optimizing network traffic may not be the same concern, although server workload, response time and/or internal data communications (e.g., retrieval of data from a mass storage device) may still benefit from the reduced volume of data transferred as a result of the herein-described usage-based optimization. Therefore, the invention is not limited to the particular implementation discussed herein.

The embodiments discussed hereinafter focus on two potential optimizations that can be implemented to reduce network traffic associated with executing database queries. The first is based on a finding that has shown that a significant number of database queries, and in particular queries such as "SELECT *" queries, are not going to use all requested columns, even though such columns have been requested. The second is based upon a finding that in many cases, while the complete set of rows is not limited in a query statement (either by a WHERE clause or specifying a maximum number of rows to return), only the first handful of rows is ever going to be actually fetched. It will be appreciated, however, that usage data may be utilized in other embodiments, including non-relational databases that do not organize data into explicit rows and columns, to inhibit the transfer of unnecessary data between a client and server. Therefore, the invention is not limited to the particular embodiments discussed herein.

In one embodiment that will be discussed hereinafter, usage data is obtained when processing a first block of returned data, based upon what columns are actually retrieved by a client when processing the result set. Subsequent blocks are then fetched as needed with only the data from the columns actually used returned in those blocks.

Take as an example an environment where data is fetched using 32K blocks, and a particular table has rows that are 2K bytes in length, each with sixteen 128 byte columns. In response to a "SELECT *" query, when the first block of data is sent to the client, nothing is known about how the data will be used. So the sixteen 2K rows are sent to the client. Consistent with the invention, in the aforementioned embodiment, as the client application accesses the data for the columns, those columns that are actually used by the client application are tracked, e.g., by incrementing counters or setting flags associated with the query, or in other appropriate manners.

Assume for the purposes of the example that it is observed when processing the first block that only Column 2, Column 3, and Column 7 are used for each row. As such, when the sixteen rows from the first block that are on the client have all been processed, the client will need to come back to the server for more data, and at that point that the statistical findings will be available for use in determining that the client is really only using these three columns.

Given this information, the aforementioned embodiment may, instead of sending the next sixteen rows in a complete form, formulate a request to send only Column 2, Column 3, and Column 7 of each row. Requesting only the three columns in the example scenario reduces the row size from 2K bytes to 384 (128*3) bytes. Given that figure, the server can now send 85 rows to the client (32K/384 bytes) instead of the 16 that were sent in the first block. Effectively, the client can perform about five times (85/16) as much processing on its side before having to return to the server for more data.

In another embodiment to be discussed, a second usage-based statistical tracking factor may be the number of rows used by the client. In particular, if a client executes a query that could return 1000 rows from the database, there is often little guarantee that the client will be interested in all 1000 of these rows. In some situations, the client operates with this recognition that the information it is interested in will be found in the first few rows of data (perhaps because of an ORDER BY clause making a field ascending or descending). Other causes might include population of a GUI table display where the application rarely ends up scrolling down beyond the first rows of data being displayed.

Consistent with the invention, it may be determined the maximum number of rows that have been or are likely to be needed by the client when executing a query. Such information may then be used to limit the number of rows returned by the server to the client in connection with execution of the database query.

In many instances, the number of rows actually used in connection with a database query may only be determined upon completion of the query. As such, in many instances, usage-based row statistics will be utilized in connection with the re-execution of a previously-executed query. Using this information, however, a server could return a block containing less than a full complement of data.

Taking the example above, again, usage-based row statistic analysis might show that no rows after the fourth row of a table have been fetched on previous runs. Given this, it may be desirable to return only the first four rows to the client. Now, instead of flowing 32K of data, only 8K may be sent.

Note that the first and second optimizations discussed above may also be implemented in connection with one another in some embodiments. In that case, were the second optimization described in the aforementioned example performed in conjunction with the first, only 1536 bytes (four rows, each including 384 bytes) would need to be transferred in a single block of data.

FIG. 2 illustrates from the perspective of a client application the typical steps that occur during execution of a database query in computer system 10. It is assumed for the purposes of the illustrated embodiment that a relational database is being accessed using database queries taking the form of SQL-compatible statements. Moreover, a two-phase prepare and execute process is utilized to process SQL statements.

Initially, as represented in block 50, a client application initiates a database query by requesting to connect to the database server. Then, as illustrated in block 72, a "prepare statement" operation is performed to prepare a statement object for accessing the database. Next, as shown in block 74, one or more parameters are provided to the prepared statement object to format the object for performing a specific query.

Next, as illustrated in block 76, the statement is executed, thereby initiating on the server the generation of a result set corresponding to the database query. In addition, as is well known in the art, at this time the server may return as prefetch data a first block of data from the result set.

The prefetch data is typically stored in a client-side prefetch cache; however, such prefetching occurs outside of the scope of the client application. The client simply requests the retrieval of data from the result set, without a concern for where the data is actually located, so whether or not requested data is stored in the prefetch cache is irrelevant to the client application.

Once the statement has been executed by the database, the client application next processes the data, typically by retrieving the desired columns of data from the rows matching the database query. As shown in FIG. 2, for example, two nested loops initiated at block 78 sequentially process each row and column within that row. Specifically, block 78 determines whether more unprocessed rows remain to be processed from the result set. If so, control passes to block 80 to perform a position row operation.

The position row operation essentially positions a pointer to a new row in the result set, and functions much as a "get next record" request in a non-relational database. As used herein, a record request may incorporate any request made by a client to process a row or record in connection with processing the results of a database query. In this regard, in prefetch-enabled systems, the initial execute operation initiated in block 76, which results in the return of a first block of rows to the prefetch cache, may also correspond in many respects to a record request consistent with the invention. It should also be appreciated that in a prefetch-enabled system, a particular record request may or may not result in the actual transfer of data from a server to a client.

Once a new record has been obtained via the position row request, a loop is initiated in block 82 to process each desired column of data from the current row. Thus, block 84 initiates a retrieval of a value from the result set in the form of a get column operation. In addition, as shown in block 86, the retrieved data may also be processed at this time as is desired for the client application. Control then returns to block 82, where additional columns are processed for the current row. Once all columns have been processed, block 82 returns control to block 78 to process additional rows from the result set. Once all rows have been processed, block 78 completes execution of the statement, as represented at block 88.

With a JDBC-based environment, operations such as "connect," "prepare statement," "execute," "position row," and "get column" are handled via requests made from the client application to the JDBC driver client-side portion, and are often followed by intra-driver requests from the JDBC driver client-side portion to the JDBC driver server-side portion, and requests ultimately to the database management system. However, the setting of parameters is typically handled at the client application and client-side portion of the JDBC driver, without interaction with the server. Furthermore, whenever a position row or get column request may be fulfilled from the prefetch cache, no request is typically required of the server. In fact, it is through the reliance on the prefetch cache that much of the network traffic between the client and server can be avoided.

It will be appreciated that other statement processing operations may be utilized in other environments. The invention is therefore not limited to the particular interaction discussed in connection with FIG. 2.

As mentioned above, the invention enables a reduction in network traffic by determining a subset of data that may be returned to a client in response to a particular database query. By returning only a subset, rather than all of the data requested, it is envisioned that otherwise unnecessary data is never transferred, thus reducing the amount of bandwidth utilized during execution of a database query. In the illustrated embodiment, the determination of what data can be returned in response to a database query is based upon a usage statistic tracked by the client-side portion of the JDBC driver. Moreover, the determination of what data should be returned, as well as the initiation of the retrieval of such data from the server, is also initiated by the client-side portion of the driver. Furthermore, it is typically during the retrieval of prefetch data outside of the scope of the client application that the tracking of usage data, as well as the determination of the subset of data to be returned, is made. Consequently, in many embodiments, the herein described optimization can be implemented solely within a JDBC or other database driver.

Figure 4:
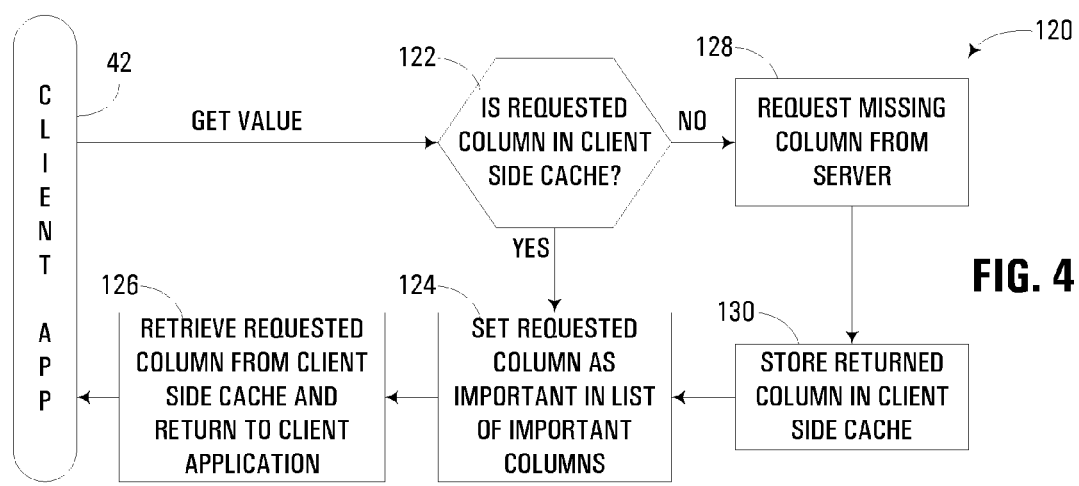
FIG. 4 is a flowchart illustrating the program flow of a get column routine executed by the client-side database driver in response to the get column request illustrated in FIG. 2.

FIGS. 3 and 4 illustrate one implementation of the aforementioned column-based optimization. Specifically, as illustrated in FIG. 3, a position row routine 100, executed by a client-side portion of a database driver, may utilize a usage statistic to control the data that is returned during process of a database query. In the context of a JDBC API, a position row operation is typically initiated by either an execute or next request generated by client application 42. During such a request, block 102 determines first whether a requested row (either the first row or the next row) is resident in the client-side cache. If so, no request need be made of the server, and as such, control may pass to block 104 to update a result set pointer to point to the requested row. A "success" result is then returned to the client application, and processing of the position row request is complete.

If, on the other hand, the requested row is not resident in the client-side cache, block 102 passes control to block 106 to determine whether a usage statistic, here a list of important columns, exists for the current statement being executed. Assuming first that no such list currently exists, as might be the case during the initial execution of a database query (and where persistent usage statistics are not maintained), control passes to block 108 to request a full block of rows from the server. Control then passes to block 110 to wait for the block of data to be returned by the server, and to store the returned rows in the client-side cache. Control then passes to block 104 to update the pointer and return a "success" result to the client application.

If, on the other hand, block 106 determines that a list of important columns does exist for the current statement, indicating that usage information has been generated for that statement, control passes from block 106 to block 112 to request a block of rows from the server, but specifying the specific columns in the list of important columns. Put another way, only those columns denoted as "important" from the perspective of the statement, are requested from the server. Control then passes to block 110 to wait for the data to be returned, and to store the returned data in the client-side cache. Control then passes to block 104 to update the pointer, and return a "success" result to the client application.

Where the functionality described in routine 100 is implemented within a client-side portion of a database driver, a server-side database driver may be implemented using a predominantly conventional design, with the only modification being to permit the driver to be responsive to intra-driver requests that specify which columns should be returned in a block of data. The configuration of a server-side portion of a database driver to implement such functionality would be well within the ability of one of ordinary skill in the art having the benefit of the instant disclosure.

FIG. 4 next illustrates a get column, or get value routine 120 that is utilized to process the columns in a current row, as well as to track the actual usage of columns for a particular statement. As shown in FIG. 4, routine 120 begins in block 122 by determining whether a requested column is resident in the client-side cache. If so, control passes to block 124 to set the requested column as "important" in the list of important columns, indicating that the column has actually been used during processing of the data. The list of important columns may be implemented using flags, counters, and other suitable data structures known in the art. Control then passes to block 126 to retrieve the requested column from the client-side cache and return the data to the client application. Routine 120 is then complete.

Returning to block 122, if the requested column is not in the client-side cache, control passes to block 128 to request the missing column from the server. In this regard, it may be desirable to include additional functionality in the server-side portion of the database driver to respond to requests for particular columns from a given row. Control then passes to block 130 to wait for the returned data from the server, and store that data in the client-side cache. Control then passes to block 124 to update the list of important columns and forward the requested column to the client application (block 126).

It will be appreciated that the usage data for a particular statement may be stored in a number of data structures consistent with the invention. For example, the list of important columns may be generated during the processing of an initial block of rows returned in response to a database query. In particular, as described above, it may be desirable to retrieve all columns from a block of rows subsequent to execution of a query when the first block of rows is being returned. In such an instance, the list of important will typically be null upon the execution of the query.

In other embodiments, however, usage data may be stored more persistently and shared between various clients, threads within clients, or re-executions of particular database queries. For example, where statement pooling is utilized, usage data may be associated with particular prepared statements, e.g., as fields in the objects or within a separate data structure referenced by such objects. Doing so would permit subsequent executions of a database query by the same client application, by other threads within the client application, by other client applications, or even by other users of the client applications, to initially retrieve an optimized block of data based upon usage data gained from past experience. As such, additional functionality may be incorporated into the database driver to persistently store or modify usage data for a statement after a statement has been executed.

As mentioned above, it may also be desirable to restrict the number of rows returned in a given block based upon usage data. In this situation, typically a prior execution of a database query will be required to generate the appropriate usage data, as the restriction on the number of rows returned in reply to a database query can often not be determined until after execution of the database query is complete.

Figure 5:
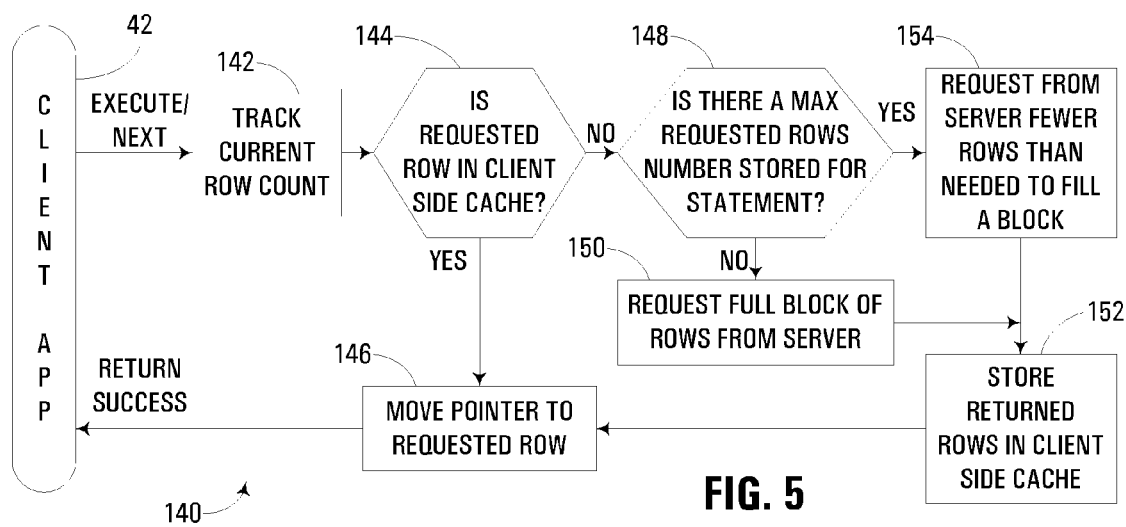
FIG. 5 is a flowchart illustrating the program flow of an alternate position row routine to that shown in FIG. 3.

FIG. 5, for example, illustrates a position row routine 140 used to limit the number of rows returned to a client in response to a database query. As shown in FIG. 5, position row routine 140 begins in block 142 by tracking the current row count, i.e., the number of rows processed during this execution of the database query. In connection with tracking the current row count, block 142 may also update a maximum row count associated with the database query for future executions of the query. In addition, the maximum rows may be based upon, but different than the row count tracked in block 142. For example, if a prior execution of a database query required the processing of only ten rows, it may be desirable to request a comparatively larger number of rows (but still less than the total number of rows that can be fit within a given block of data) as a conservative measure.

Block 144 next determines whether the requested rows are in the client-side cache. If so, control passes to block 146 to move the pointer to the requested row, and return "success" to the client application.

Returning to block 144, if the requested row is not cached, control passes to block 148 to determine whether a maximum number of requested rows is associated with the current statement or database query. If not, control passes to block 150, whereby a full block of rows is requested from the server. Control then passes to block 152 to wait for the rows to be returned, and to store the returned rows in the client-side cache. Control then passes to block 146 to update the row pointer.

Returning to block 148, if a maximum number of requested rows is associated with the statement, control passes to block 154 to request from the server fewer rows than needed to fill a block. As discussed above, this number may be associated with the actual number of rows used during a prior execution of the database query, or some other number derived from this usage data. In this embodiment, it will be appreciated that the server-side portion of the database driver typically includes functionality to respond to a request for a portion of a full block of data.

Various modifications may be made to the illustrated embodiments from the spirit and scope of the invention. For example, both the iteration of a list of important columns, as well as a tracking of a number of rows utilized during execution of a database query, can be combined to provide further optimization of network traffic. Thus, for example, if it is determined that a particular database query relies upon only a small number of rows, as well as only a small number of columns from each of those rows, only the specific columns from the limited number of rows may be returned to the client by the server. Such functionality may be implemented, for example, by incorporating the functionality of blocks 106, 108 and 112 of routine 100 into each of blocks 150 and 154 of routine 140.

It will also be appreciated that other forms of usage data, which are reflective of how a client application utilizes the data retrieved in response to a database request, may be utilized in formulating a subset of data to be returned by the server.

As a specific example of the potential optimization that can occur in the manner described herein, consider a "CUSTOMER" table having the format shown in Table 1.

TABLE 1

CUSTOMER TABLE FORMAT

| COLUMN | SIZE |
| --- | --- |
| Customer Number | Char (8) |
| Customer First Name | Char (10) |
| Customer Last Name | Char (20) |
| Customer Company | Char (30) |
| Address1 | Char (50) |
| Address2 | Char (50) |
| Address3 | Char (50) |
| Phone | Char (10) |
| City | Char (20) |
| State | Char (2) |
| Zip | Char (9) |
| TOTAL | 259 Bytes |

Now assume the aforementioned table has 10,000 customers represented by 10,000 rows, as well as the client data block size being 32K in size.

Also assume for the purposes of the example that the client application issues a "SELECT * from CUSTOMER" statement to the database to retrieve all rows from the CUSTOMER Table. Without the aforementioned optimization, 126 rows of data (32K/259) would be returned in each block of data from the server. As a result 80 network requests would be required to return all of the requested data.

Now, for example, assume that the aforementioned query was utilized to generate a customer phone number list, which required only the Customer Number, Customer Last Name, Customer First Name, and Phone columns from the Customer Table, representing a total of 48 bytes for each customer row or record. Considering the embodiment where a full fetch of all columns is initiated during prefetching of a first block upon execution of a query, the first fetch would result in the return of 126 rows of data. However, when processing the first block of data, it would be determined via routine 120 of FIG. 4 that only the aforementioned four columns were actually used by the client. As a consequence, only those columns are returned on all following fetches. As a result, each block of data returned to the client by the server, and including only the necessary columns of data, would permit 682 rows (32K/48) to be returned in each block of data. Taking out the 126 rows returned in the first block, the remaining 9,874 could then be communicated with as few as fifteen additional blocks of data (9,874/682), resulting in a total number of sixteen fetches over the network, which is only about 20% of the 80 fetches that would otherwise be required.

In addition, in some embodiments, it may be desirable to incorporate data compression to compress the data returned in a given block of data. When utilized in connection with the optimization described herein, further optimizations can be obtained.

The illustrated embodiments provide a number of unique advantages over conventional designs. For example, the amount of data, as well as the number of fetches required from a server, can be substantially reduced, thereby reducing network traffic, database overhead, and processing throughput. Coupling this functionality with statement pooling also permits the usage of data by prior database queries, by the same or different clients, to further reduce the expenditure of network traffic and other resources due to the transfer of unnecessary data.

Also, providing the herein-described optimizations in a database driver or other API that provides statement pooling for reuse could essentially eliminate the need for application developers to use SQL clauses specifying maximum numbers of rows to return, which is beneficial to the extent that such a feature is not supported by all databases and is not consistent in all of those databases that do support it. As a result, by eliminating the need for a customer to specify maximum rows, developers may be able to write more portable applications through the use of simpler SQL statements that are supported by all SQL-compatible databases.

The optimizations described herein can also significantly improve the performance of database access in situations where the data is to be sent over the network in alternative formats. For example, an increasingly common practice is to use Simple Object Access Protocol (SOAP) for the transfer of data. Two of the primary advantages of SOAP are that it is built on HTTP so it can automatically travel through a firewall, and it is text based so binary incompatibilities between heterogeneous systems are relatively easy to avoid. However, one problem with protocols like SOAP is that it is pretty expensive to generate the data in a text-based format. Using the methods outlined herein, performance can be significantly improved by avoiding the generation of SOAP packets for information that a client will never use anyway.

Similarly, additional benefits may be available to wireless device developers in that often times the code that is being put on wireless devices is derivative work form applications built for platforms where resources are much less constrained. Given time to market pressures, it is typical to change as little as possible about the desktop version of the code. Often, the first time that the developer thinks about inefficiencies is when a wireless device fails in testing due to its resources being exhausted. Using the herein-described optimizations, it becomes less likely that device resources will get taxed to the point where such failures happen.

Various additional modifications may be made to the illustrated embodiments without departing from the spirit and scope of the invention. Therefore, the invention lies in the claims hereinafter appended.

What is claimed is:

1. A method of processing a database query from a client in a client-server database management system, the method comprising:

receiving a database query from a client;

responding to the database query by returning to the client only a subset of the data requested by the client in the database query based upon a usage statistic associated with the database query such that less than all of the data requested by the client in the database query is returned to the client in response to the database query, wherein the usage statistic is based upon automatically tracked usage data that is indicative of how data requested by the client is used by the client; and during a current or prior execution of the database query, generating the usage statistic by automatically tracking the usage of data returned in response to the database query during the current or prior execution of the database query to identify data from among the data returned in response to the database query that is unlikely to use, wherein the subset of data excludes data identified during automatic tracking as being unlikely to use.

2. The method of claim 1, wherein the usage statistic is indicative of how the data requested by the client is expected to use by the client, the method further comprising determining the subset of data to return the client in response to the database query based upon the usage statistic.

3. The method of claim 2, wherein the database query is generated by a client application resident on the client, and wherein determining the subset of data to return to the client is performed by a database driver.

4. The method of claim 3, wherein at least a portion of the database driver is resident on the client, and wherein determining the subset of data to return to the client is performed by the portion of the database driver resident on the client.

5. The method of claim 4, wherein at least a portion of the database driver is resident on a server, wherein the portion of the database driver resident on the server is responsive to the portion of the database driver resident on the client to retrieve the subset of data from a database and communicate the subset of data to the client, wherein the portion of the database driver resident on the client is configured to issue an intra-driver request specifying the subset of data, and wherein the portion of the database driver resident on the server is configured to return the subset of data responsive to the intra-driver request.

6. The method of claim 2, wherein the database query requests a plurality of columns from at least one row of data from a table stored in the database management system, wherein determining the subset of data to return to the client includes determining a subset of the plurality of columns to return for the at least one row of data, and wherein automatically tracking the usage of data returned in response to the database query during the current or prior execution of the database query includes identifying at least one column from among the plurality of columns that is unlikely to use, wherein the subset of columns excludes the at least one column that is unlikely to use.

7. The method of claim 6, wherein the usage statistic is associated with which of the plurality of columns are likely to use by the client, and wherein the subset of the plurality of columns includes only the columns likely to use by the client.

8. The method of claim 2, wherein the database query requests a plurality of rows from a table stored in the database management system, wherein determining the subset of data to return to the client includes determining a subset of the plurality of rows to return, and wherein automatically tracking the usage of data returned in response to the database query during the current or prior execution of the database query includes identifying at least one row from among the plurality of rows that is unlikely to use, wherein the subset of rows excludes the at least one row that is unlikely to use.

9. The method of claim 8, wherein the usage statistic is associated with a number of rows actually used during a prior execution of the database query.

10. The method of claim 1, further comprising compressing the subset of the data before returning the subset of data to the client.

11. The method of claim 1, further comprising generating the usage statistic during a first execution of the database query, and using the usage statistic during a second execution of the query to determine the subset of data to return to the client in response to the database query.

12. The method of claim 1, wherein the usage statistic is generated during execution of the database query by a different client.

13. The method of claim 1, wherein the usage statistic is generated during processing of data returned during execution of the database query.

14. The method of claim 1, wherein the usage statistic is generated during processing of prefetched data during execution of the database query.

15. A method of processing a database query from a client in a client-server database management system, the method comprising:

receiving a database query from a client, wherein the database query requests a plurality of rows and a plurality of columns from a table stored in the database management system;

generating a usage statistic associated with the database query and indicative of how the data requested by the client is used by the client during a current or prior execution of the database query, wherein the usage statistic is based on automatically tracked usage data and identifies data from among the data requested by the client that is unlikely to use;

determining a subset of data to return to the client in response to the database query based upon the usage statistic, including determining at least one of a subset of the plurality of rows and a subset of the plurality of columns anticipated to be used by the client, wherein the subset of data excludes data identified during generation of the usage statistic as being unlikely to use; and responding to the database query by returning to the client only the subset of the data requested by the client in the database query such that less than all of the data requested by the client in the database query is returned to the client in response to the database query.

16. The method of claim 15, wherein determining the subset of data to return to the client in response to the database query based upon the usage statistic includes determining a subset of the plurality of rows such that less than all of the rows requested by the client in the database query are returned to the client in response to the database query.

17. The method of claim 15, wherein determining the subset of data to return to the client in response to the database query based upon the usage statistic includes determining a subset of the plurality of columns such that less than all of the columns requested by the client in the database query are returned to the client in response to the database query.

18. The method of claim 15, wherein determining the subset of data to return to the client in response to the database query based upon the usage statistic includes determining a subset of the plurality of rows and a subset of the plurality of columns such that less than all of the rows and columns requested by the client in the database query are returned to the client in response to the database query.

19. An apparatus, comprising:
at least one processor; and program code configured to be executed by the at least one processor to respond to a database query from a client in a client-server database management system by returning to the client only a subset of the data requested by the client in the database query based upon a usage statistic associated with the database query such that less than all of the data requested by the client in the database query is returned to the client in response to the database query, wherein the usage statistic is based upon automatically tracked usage data that is indicative of how data requested by the client is used by the client, and wherein the program code is further configured to, during a current or prior execution of the database query, generate the usage statistic by automatically tracking the usage of data returned in response to the database query during the current or prior execution of the database query to identify data from among the data returned in response to the database query that is unlikely to be used, wherein the subset of data excludes data identified during automatic tracking as being unlikely to use.

20. The apparatus of claim 19, wherein the program code comprises a client-side portion of a database driver, the apparatus further comprising:
- a client computer within which is resident the program code; and
- a server computer coupled to the client computer, the server computer including a server-side portion of the database driver, the server-side portion of the database driver configured to transmit the subset of the data to the client-side portion of the database driver.

21. The apparatus of claim 19, wherein the database query requests a plurality of columns from at least one row of data from a table stored in the database management system, and wherein the program code is configured to determine the subset of data to return to the client by determining a subset of the plurality of columns to return for the at least one row of data.

22. The apparatus of claim 19, wherein the database query requests a plurality of rows from a table stored in the database management system, and wherein the program code is configured to determine the subset of data to return to the client by determining a subset of the plurality of rows to return.

23. The apparatus of claim 19, wherein the usage statistic is generated during a prior execution of the database query.

24. The apparatus of claim 19, wherein the usage statistic is generated during processing of prefetched data during execution of the database query.

25. A program product, comprising:

a recordable computer readable medium; and program code stored on the recordable computer readable medium and configured upon execution to respond to a database query from a client in a client- server database management system by returning to the client only a subset of the data requested by the client in the database query based upon a usage statistic associated with the database query such that less than all of the data requested by the client in the database query is returned to the client in response to the database query, wherein the usage statistic is based upon automatically tracked usage data that is indicative of how data requested by the client is used by the client and wherein the program code is further configured to, during a current or prior execution of the database query, generate the usage statistic by automatically tracking the usage of data returned in response to the database query during the current or prior execution of the database query to identify data from among the data returned in response to the database query that is unlikely to use, wherein the subset of data excludes data identified during automatic tracking as being unlikely to use.

\* \* \* \* \*